March 18, 1924.

G. W. YOUNG

BOOKBINDING MACHINE

Filed March 26, 1923   9 Sheets-Sheet 1

1,487,305

Inventor
George W. Young
By [signature]
Attorneys

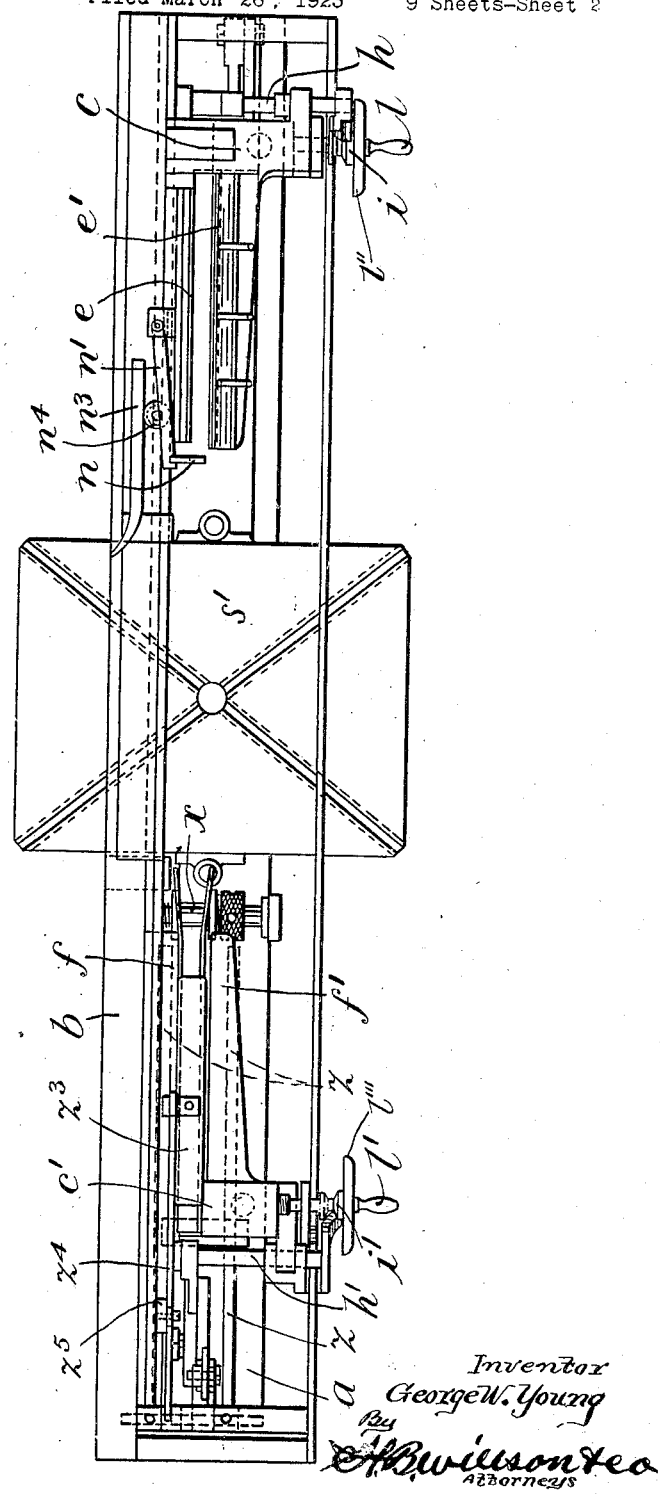

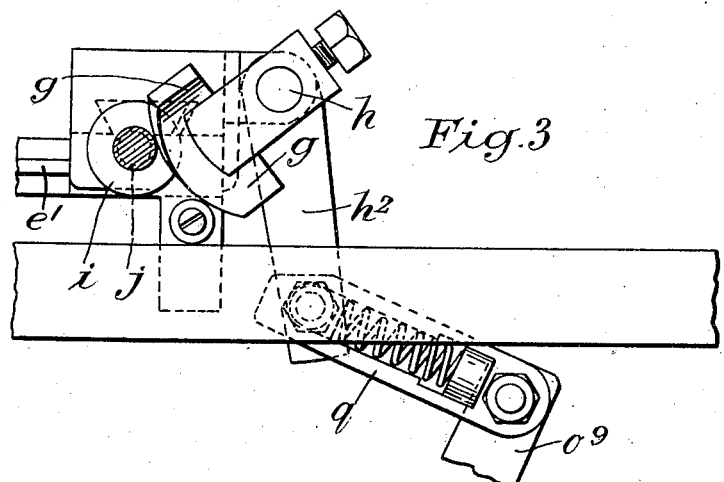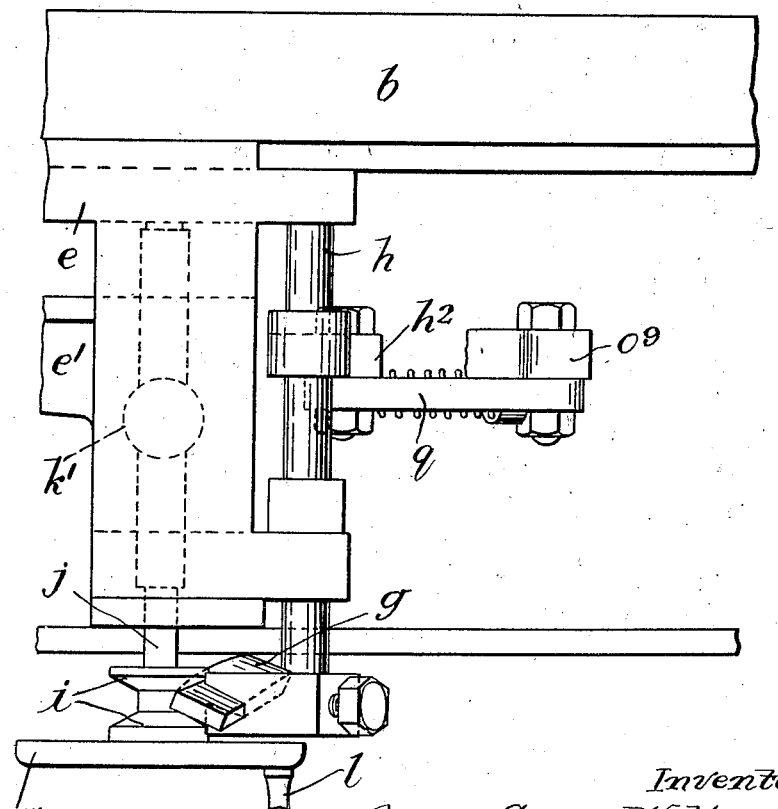

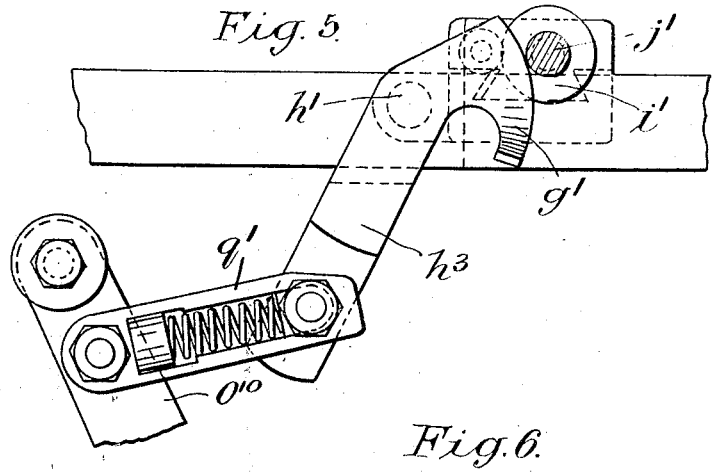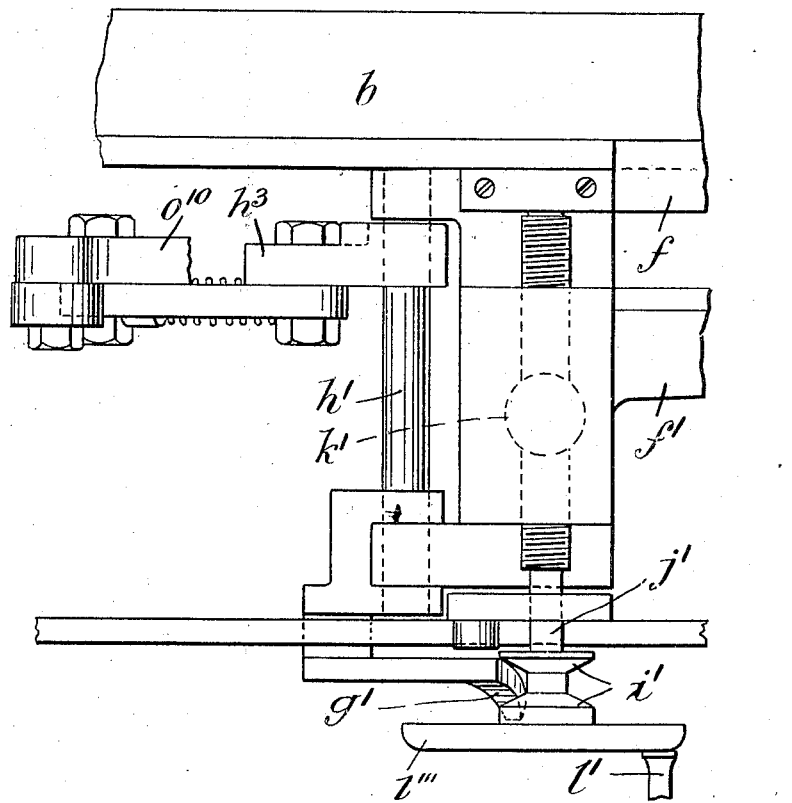

March 18, 1924.  
G. W. YOUNG  
BOOKBINDING MACHINE  
Filed March 26, 1923

Inventor  
George W. Young  
By H. B. Willson & Co.  
Attorneys

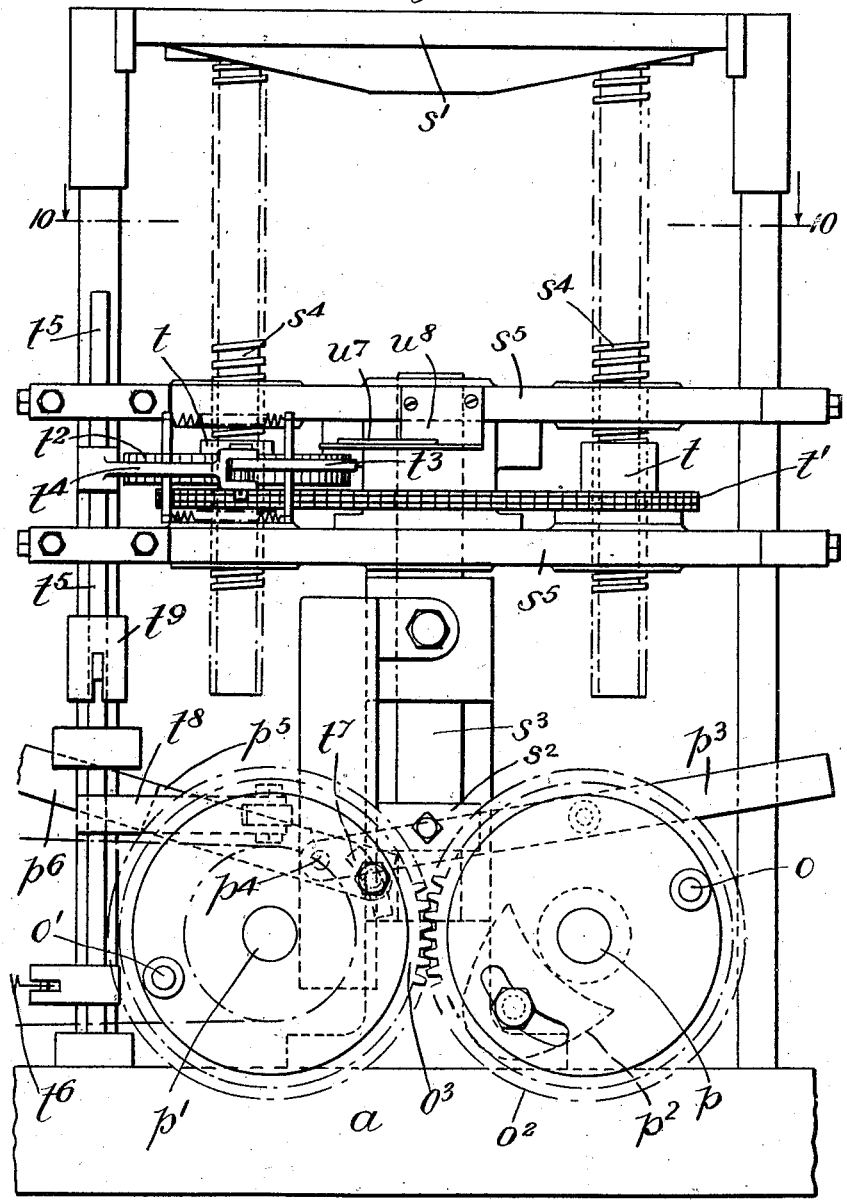

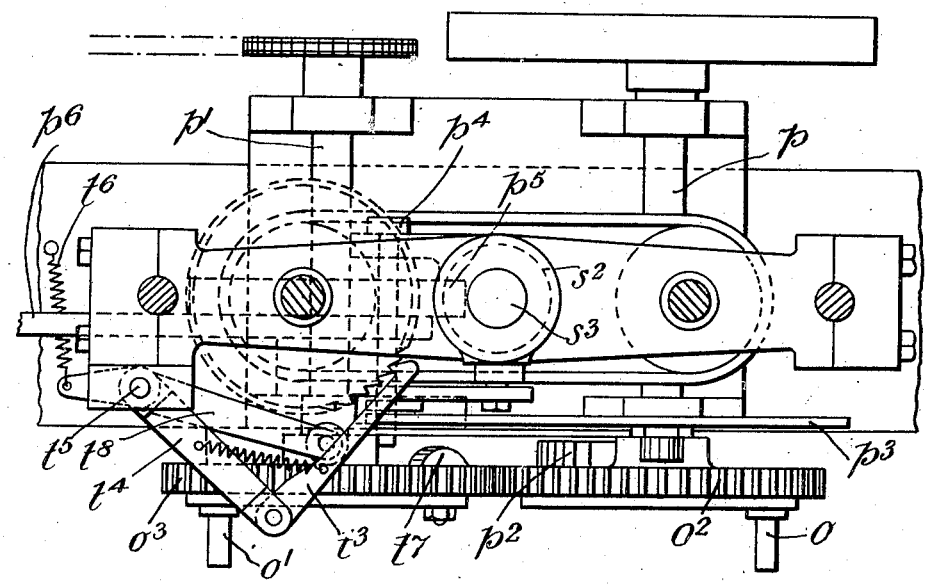
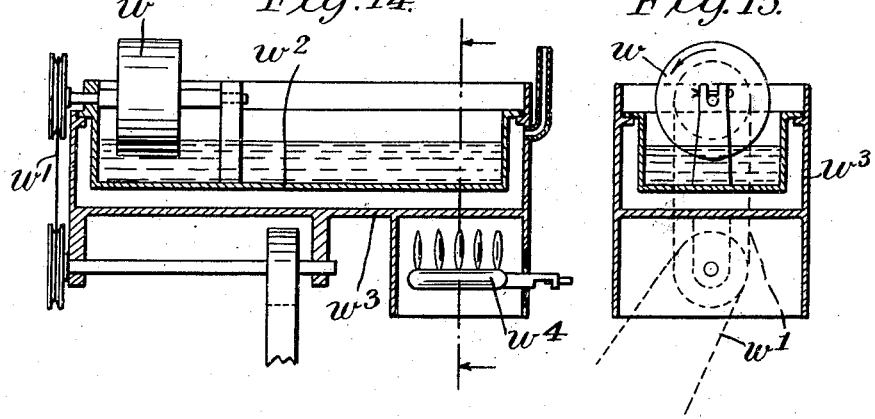

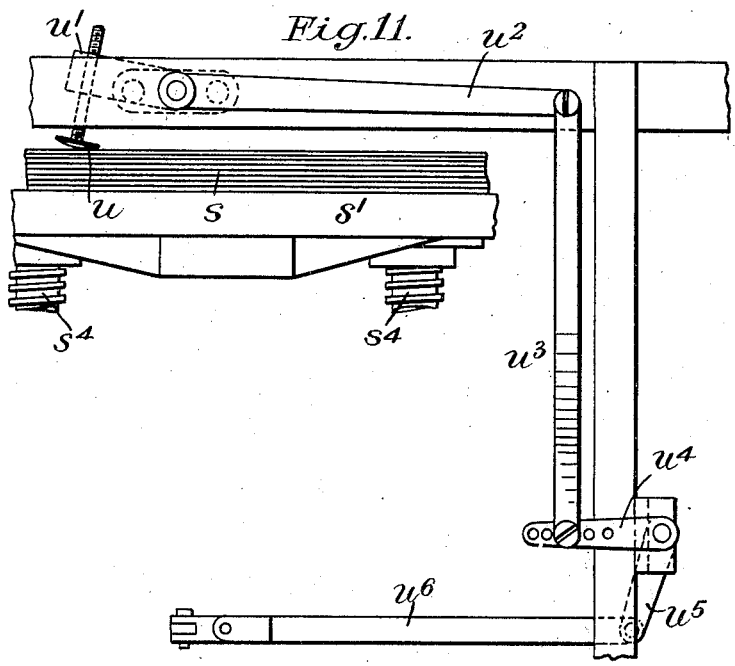
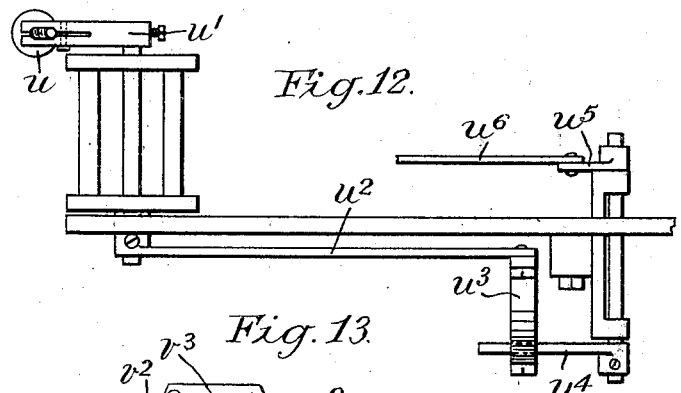
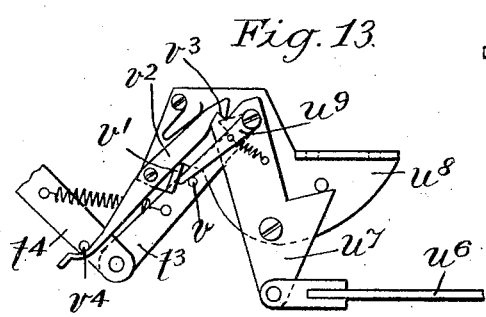

March 18, 1924.

G. W. YOUNG

BOOKBINDING MACHINE

Filed March 26, 1923    9 Sheets-Sheet 9

1,487,305

Inventor
By George W. Young
H. R. Wilson & Co.
Attorneys

Patented Mar. 18, 1924.

1,487,305

UNITED STATES PATENT OFFICE.

GEORGE WILLIAM YOUNG, OF LONDON, ENGLAND.

BOOKBINDING MACHINE.

Application filed March 26, 1923. Serial No. 627,925.

*To all whom it may concern:*

Be it known that GEORGE WILLIAM YOUNG, of 10, Marmora Road, Honor Oak, London, S. E. 22, England, whose post-office address is 10, Marmora Road, Honor Oak, London, S. E. 22, England, a subject of the King of Great Britain and Ireland, has invented certain new and useful Improvements in or Relating to Bookbinding Machines, of which the following is a specification.

This invention relates to an improved machine for fixing covers to stitched or sewn copies of magazines, pamphlets, catalogues, booklets and the like. According to this invention the work to be bound is placed in a carriage mounted to run or slide on a horizontal support, the book being held in such manner near the back edge that said edge is fully exposed below the carriage or otherwise. Mechanism is provided for moving the book and carriage forward over a roller which is revolved in liquid glue, whereby glue is applied to the back of the book. The book is then brought over a pile of covers which is moved upwards mechanically, causing the top cover of the pile to adhere to the glued back portion of the book. After this operation the book with the cover attached is then transferred to another carriage automatically, the second carriage engaging the book and carrying it forward for a further operation or operations whilst the first carriage is automatically and simultaneously released and travels back to its first position. Whilst being held on the second carriage, the book is acted upon by a suitable roller or rollers adapted to apply pressure along the back and along the side portions of the book adjacent to the back, means being also provided for closing the covers after the rolling operation.

The book then falls or is delivered from the carriage and slides down an inclined table into a hopper or on to a revolving band or tape conveyor which carries the book forward and deposits it where required.

It will be understood that provision is made for the adjustment of the mechanism in accordance with the varying thickness of the back of the book and also the varying sizes.

The invention is hereinafter described with reference to the accompanying drawings in which;

Fig. 2 is a plan of the same, Figs. 3 and 4 are detail elevation and plan respectively on a larger scale of the mechanism employed for actuating and adjusting the gripping jaw of the first or feed carriage.

Figs. 5 and 6 are similar views to Figs. 3 and 4 illustrating the mechanism for actuating and adjusting the second or delivery carriage.

Fig. 9 is an elevation of the middle portion of the machine on a larger scale than Fig. 1.

Fig. 10 is a sectional plan taken along the line 10—10 Fig. 9.

Figure 16:
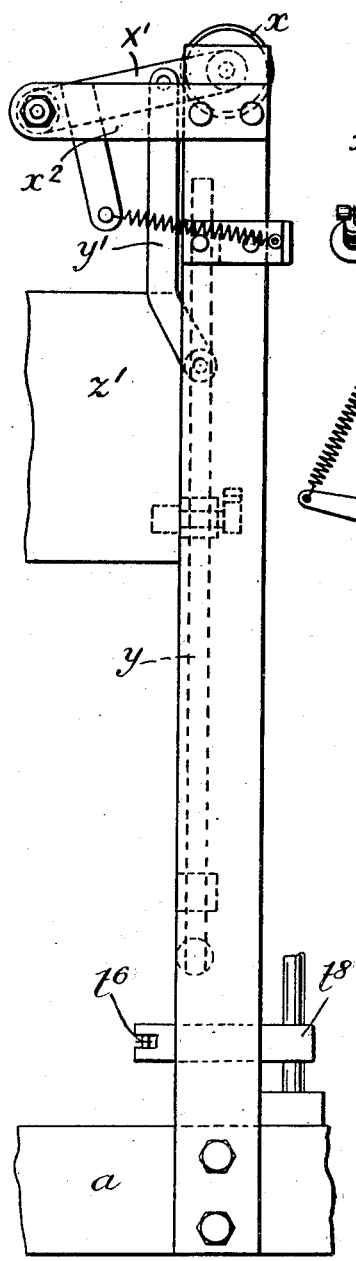
Figure 17:
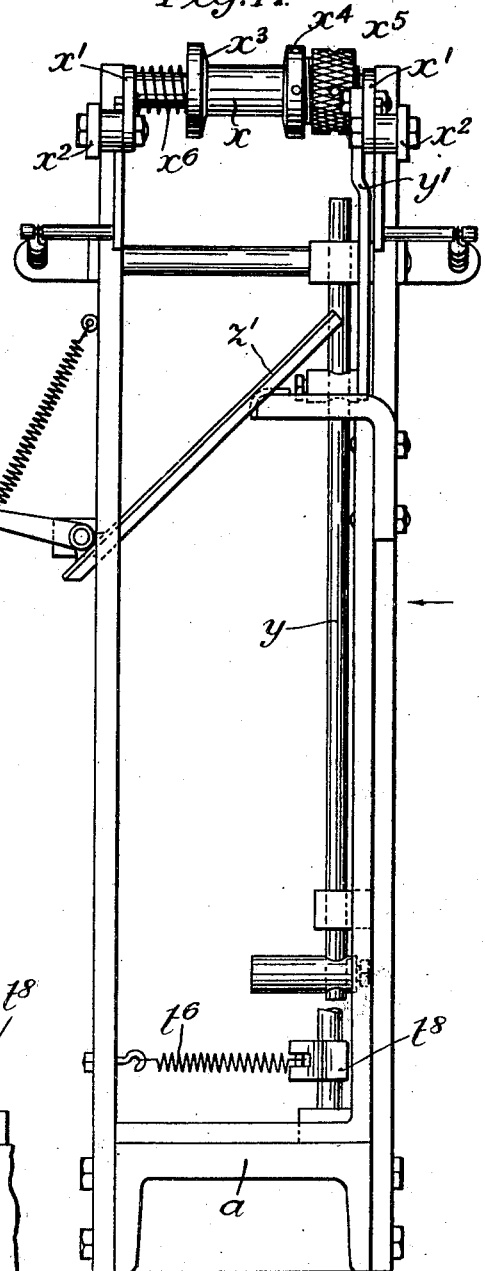

Fig. 11 is an elevation of lever mechanism for actuating feed regulating mechanism for varying the upward movement of the feed table, Figs. 12 and 13 illustrate the feed regulating mechanism in plan, the plan being separated into two figures for the sake of clearness, Figs. 14 and 15 are longitudinal and transverse sections of the glueing apparatus, Figs. 16 and 17 are side and end elevation respectively of the mechanism for pressing the cover against the back and sides of the book.

In the practical form of construction illustrated in the drawings, the frame of the machine, which may be built up or cast in one piece, comprises a base member $a$ above which at a convenient height and towards the rear side of the machine is supported a horizontal guide member and support $b$ for two oppositely reciprocating travelling grippers or carriages $c$ $c'$ in which the book is held successively as it passes from the feed to the delivery end of the machine. On the front face of the horizontal guide member two horizontal dovetail guides, bars or ribs $d$, $d'$ are provided and engage guide grooves of corresponding shape in the travelling grippers or carriages which are adapted to slide freely thereon in front of the guide member or carrier $b$. As shown the two dovetail guides $d$, $d'$ one for each carriage run from opposite ends of the machine and overlap at the middle over the place where the pile of covers is supported and where the books are transferred from one carriage to the other, the carriage guide $d$ running from the feed end being at a higher level than the carriage guide $d'$ running from the delivery end of the machine.

Each carriage or travelling gripper has a pair of overhanging vertical jaws $e$, $e'$ and $f$, $f'$ between which the books are gripped and held parallel with the path of movement of the carriage with the back downwards and exposed below the carriage. One jaw $e'$, $f'$ of each pair is mounted to slide on guides at right angles relatively to the other jaw $e$ $f$ and is actuated automatically to grip the book placed between the jaws when the carriage is about to begin its movement in one direction and to release the book when the reverse movement of the carriage begins, by a suitably shaped cam $g$ or $g'$ carried on a rock shaft $h$ or $h'$ on the carriage and engaging between a pair of collars $i$ or $i'$ or in a grooved boss on a spindle or rod $j$ or $j'$ connected with the relatively movable gripping jaw $e'$ or $f'$ and capable of being moved endwise by the action of the cam. The jaw actuating spindle $j$ or $j'$ is also screw-threaded and runs through a screw-threaded aperture or nut $k$ or $k'$ on the jaw so that by rotating the spindle through a suitable handle $l$ or $l'$ on the disks $l''$ or $l'''$ carried by the spindle $j$ or $j'$ the gripping and release positions of the jaw can be adjusted according to the thickness of the books to be held. For positioning the back of the book at the correct level in the feed carriage a table $m$ is adjustably mounted on the framing at the feed end of the machine below the gripping jaws of the carriage.

A positioning gauge stop $n$ for the book is also arranged to extend across the inner ends of the gripping jaws $e$, $e'$ of the feed carriage $c$ and is carried on spring pressed arms $n'$ pivoted on the jaw $e$, the stop $n$ being moved into operative position against the action of the spring $n^2$ by a rail $n^3$ fixed to the frame of the machine at the feed end in the path of a roller $n^4$ on the stop arm $n'$. When the roller leaves the rail on the forward advance of the carriage the spring $n^2$ removes the stop out of the way so that it shall not interfere with the transference of the book from one carriage to the other.

The two carriages $c$, $c'$ are caused to travel simultaneously from the opposite ends of the machine to the middle and back again by lever mechanism actuated by crank pins $o$, $o'$ carried on a pair of intermeshing gear wheels $o^2$, $o^3$, driven by a suitable motor $o^4$ on the machine or by belting from a power shaft. The gear wheels $o^2$, $o^3$ are keyed on shafts $p$, $p'$ mounted to rotate in bearings on the base of the machine and their crank pins $o$, $o'$ are connected by rods $o^5$, $o^6$ with levers $o^7$, $o^8$ fulcrumed on the base of the machine and having long upwardly extending lever arms $o^9$, $o^{10}$ which are linked by spring links $q$, $q'$ to arms $h^2$, $h^3$ on the rocking shafts $h$, $h'$ of the carriages in such manner that not only is the travel of the carriages effected but the gripping jaws of the carriages are operated at each reverse movement of the carriage to open or close as necessary by the actuation of the rocking shafts $h$, $h'$ and the cams $g$, $g'$ controlling the opening and closing movements of the jaws.

In order to ensure that the carriages shall register correctly for the transference of the books from one carriage to the other, stop plates $r$, $r'$ are provided on the carriages and come against gauging stops $r^2$, and $r^3$ on the frame.

Figure 1:
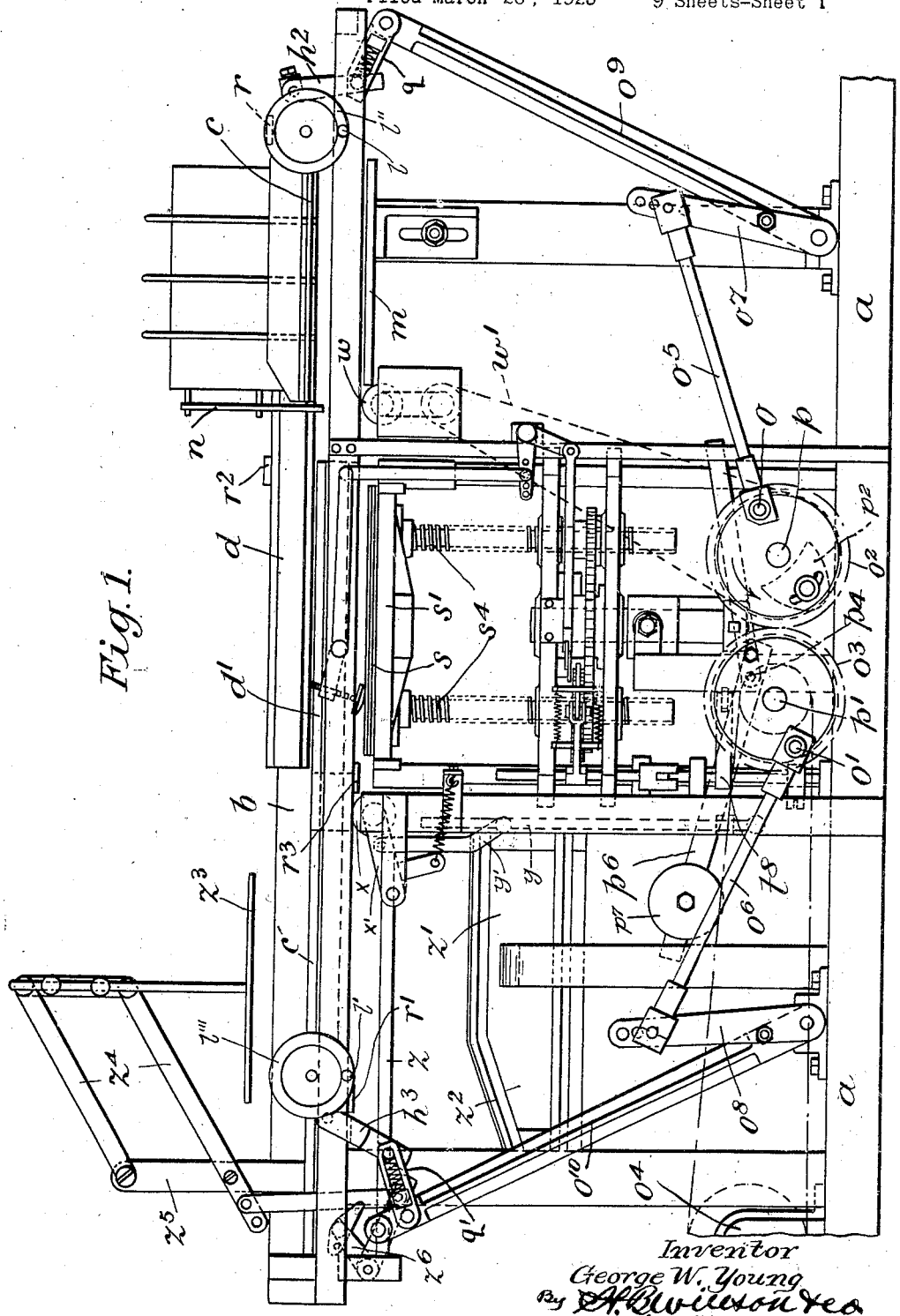
Fig. 1 is a front side elevation of a machine constructed according to this invention some of the details being omitted for the sake of clearness.
Figure 7:
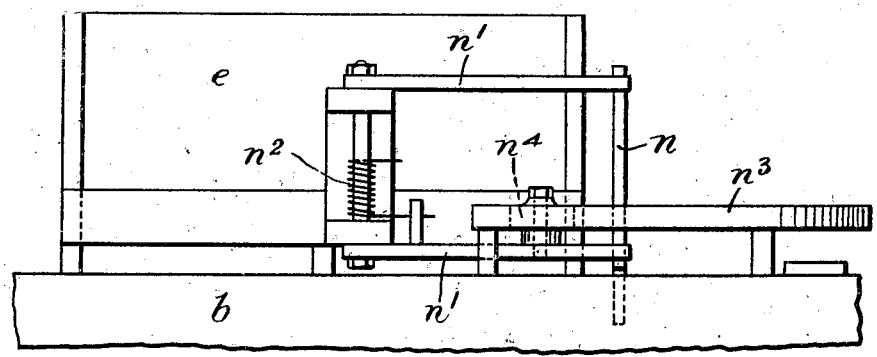
Figs. 7 and 8 are an elevation from the rear side of the machine and a plan respectively showing a positioning gauge stop for the book.
Figure 8:
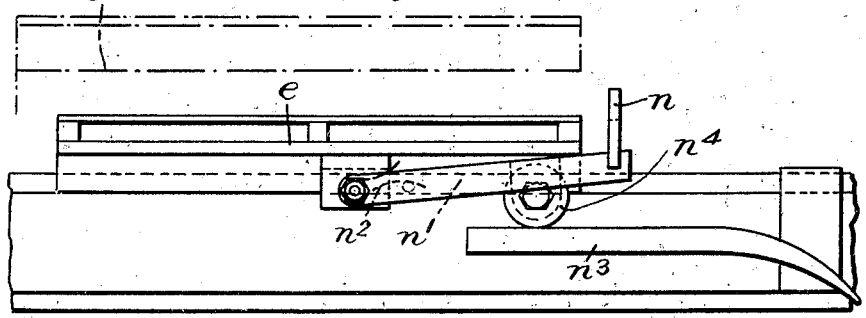

At the middle of the machine below the overlapping portions of the carriage guides $d$, $d'$ the pile of book covers $s$ Figs. 1 and 11 is supported on a vertically movable table $s'$ adapted to press the top cover of the pile against the back of the book and actuated by a cam $p^2$ carried on the gear wheel $o^2$ and timed to lift the table when the book is brought over same. The cam acts on a lever $p^3$ arranged to operate a rocking shaft $p^4$ provided with two arms $p^5$, $p^6$ one of which $p^5$ engages a collar or projection $s^2$ on a vertically displaceable rod or bar $s^3$ on which the table is supported, the table proper being adjustably supported by screw-threaded spindles $s^4$, $s^4$ above a cross-head $s^5$ fixed to the vertically displaceable rod or bar $s^3$ aforesaid. It will be understood that after the table has been lifted by the cam $p^2$ as described to apply the cover to the book, it is lowered again by its own weight, a counterweight $p^7$ being carried by the arm $p^6$ for this purpose. The topmost cover is thus left adhering to the back of the book to which a suitable adhesive has been previously applied, and this movement of the table which constitutes in effect a vertical reciprocating movement is repeated as the different books are successively brought into position over the table.

In order to compensate for the gradual decrease in the depth of the pile of covers on the table it is necessary to impart to the table in addition to the reciprocating movement aforesaid, a progressive upward feed movement for which purpose the screw spindles $s^4$ which support the table proper pass through two nuts $t$ arranged in the crosshead $s^5$ aforesaid and geared together by chain and sprocket gear $t'$. One of the nuts is formed with ratchet teeth $t^2$ with which a feed pawl $t^3$ engages, the pawl being pivotally supported on an arm $t^4$ on a vertical shaft $t^5$ and pulled into engagement by a spring $t^6$ oscillating motion is imparted to the vertical shaft to actuate the feed pawl by a cam $t^7$ on the driving gear wheel $o^3$ hereinbefore described, operating on a lever arm $t^8$ on the shaft which after being displaced by the cam is returned by the spring $t^6$. The pawl shaft $t^5$ is divided into two parts connected by a sleeve or coupling $t^9$ which permits the upper part to partake of the vertical movement of the table $s'$ without becoming disconnected from the lower part. Owing to variations in the thickness of the covers employed, it sometimes becomes necessary to vary the upward feed of the table $s'$, and provision is made for automatically controlling the operation of the feed pawl $t^3$ to regulate the upward feed of the pile of covers according to requirements by a device which prevents the pawl $t^3$ from engaging the ratchet teeth $t^2$ when it is desired to check the feed. A feeler or finger $u$ Figs. 11 and 12 resting on the top of the pile of covers $s$, is connected through lever mechanism $u'$, $u^2$, rod $u^3$, levers $u^4$, $u^5$ and rod $u^6$ with a pivoted plate $u^7$ Fig. 13, mounted on a bracket $u^8$ and carrying a spring controlled arm $u^9$ which is moved into the path of a pin $v$ on the feed pawl $t^3$ where the arm $u^9$ bears against an inclined projection $v'$ on the bracket $u^8$ and prevents engagement of the pawl $t^3$ with the ratchet teeth $t^2$ of the nut when the feeding is to be checked. Means are also provided for maintaining the regulating device in the operative position until the pawl has cleared the ratchet tooth, consisting of a notched catch lever $v^2$ which engages a nose $v^3$ on the pivoted rocking plate, and is released at the completion of the return movement of the rocking arm $t^4$ carrying the pawl $t^3$, by a pin $v^4$ on that arm.

Fixed in the frame below the path of the books and in advance of the table on which the covers are supported, is a glueing apparatus comprising a roller $w$ rotated by suitable gear $w'$ from the main gear shaft and partly immersed in a glue receptacle $w^2$ mounted in a water tank $w^3$ heated by a gas or other suitable burner $w^4$. The backs of the books run over the glue roller as they pass to the position for receiving the covers.

A free or driven roller $x$ for pressing the cover against the back of the book and also applying pressure along the side portions adjacent to the back is resiliently supported by the lever arms $x'$ pivoted on brackets $x^2$ on the main frame adjacent to the table from which the covers are taken. End flanges $x^3$, $x^4$ are provided on the roller which engage the side portions of the cover adjacent to the back one of the flange $x^4$ having a split screw-threaded sleeve and clamping nut $x^5$ for adjustably securing it on the roller whilst the other flange $x^3$ is loose but is held against the roller by a helical spring $x^6$ on the roller shaft.

By mounting the flanges in the manner described the roller can be adjusted to take books of different thickness and can readily adapt itself to slight variations or irregularities of the back of the book. Means are also provided for depressing the roller momentarily as the book moves on to it to prevent undesired creasing of the leading edge of the cover as it enters between the flanges of the roller. For this purpose the arm $p^6$ on the cam operated rock shaft $p^4$ hereinbefore referred to is arranged to depress a vertically guided rod $y$ which is connected at its upper end by link $y'$ with one of the supporting arms $x'$ of the pressure roller $x$ and pulls the roller downwards against the action of a spring, permitting the leading edge of the book to come over the flanges of the roller without obstruction.

The book is drawn over the pressing roller by the second carriage and then released at the point of discharge through the automatic opening of the gripping jaws and falls between a pair of cover folding bars $z$, on to an inclined delivery table $z'$.

This table is pivoted in the framing of the machine and in the operative position lies under the carriage in the path of the operating lever which however, is arranged to bear against an inclined edge $z^2$ on the table to move it out of the way as the lever springs forward.

In some cases the discharge of the books from the carriage is assisted by a plunger plate $z^3$ supported by parallel links $z^4$ from bracket $z^5$ on the main frame and actuated through lever mechanism $z^6$ from the operating lever of the carriage.

I claim:—

1. In a machine for fixing covers to magazines, pamphlets, catalogues, booklets and the like, the combination with glueing apparatus and means for supporting a pile of covers, of oppositely reciprocating carriages mounted for horizontal traveling, one of said carriages being adapted and arranged to grip a book and convey it back downwards over said glueing apparatus into engagement with the top cover of a pile of covers on said supporting means, and the other carriage being arranged to grip the book from the first carriage and convey it forward with a cover attached for further treatment.

2. An improved machine for fixing covers to magazines, pamphlets, catalogues, booklets and the like, comprising oppositely reciprocating travelling carriages mounted to travel simultaneously on horizontal guides arranged at different levels from opposite ends of the machine to the middle where the guides overlap and back again, said carriages being adapted and arranged to transfer a book from one to the other, means for applying first an adhesive and then a cover to the back of the book whilst it is held in the first carriage, and means for subjecting the back and adjacent side portions of the covered book to a rolling operation whilst in the second carriage.

3. A machine according to claim 1, in which the travelling carriages are operated by lever mechanism actuated by crank pins carried on a pair of intermeshing gear wheels driven by a suitable power, substantially as described.

4. A structure as specified in claim 1, together with lever mechanism actuated by crank pins carried on a pair of intermeshing gear wheels driven by suitable power for operating the traveling carriages, and means operated by the actuating levers for opening and closing the gripping jaws of the carriages.

5. A structure as specified in claim 1, together with mechanism for raising and lowering the cover supporting means intermittently to apply the covers and provided with feed mechanism for progressively raising it to compensate for the gradual decrease in the depth of the pile of covers due to their removal, substantially as described.

6. A structure as specified in claim 1; together with mechanism for raising and lowering the cover supporting means intermittently to apply the covers and including feed mechanism for progressively raising it to compensate for the gradual decrease in the depth of the pile of covers due to their removal, and also including mechanism for controlling the operation of the feed mechanism to regulate the upward feed of the pile of covers.

7. In a machine according to claim 2, in which the means for subjecting the back and adjacent side portions of the covered book to a rolling operation includes a roller provided with flanges for rolling the back and adjacent portions of the book, and means for lowering the roller previous to its engagement with the book, substantially as and for the purpose described.

8. A machine according to claim 1, including a stop for definitely positioning the travelling carriages over the pile of covers.

9. In a machine according to claim 1, means for discharging the covered books and a pivoted inclined table arranged to convey them from the machine substantially as described.

10. A machine according to claim 2, having creasing rollers arranged to operate on the cover adjacent to the back of the book for the purpose described.

11. A machine according to claim 1, including a positioning stop for the book on the first or feed carriage on a spring pressed pivoted arm, said stop being movable into the operative position against the action of the spring by a rail fixed to the frame of the machine but being held out of the way by the spring when the book is being transferred from one carriage to the other.

In testimony whereof he has affixed his signature.

GEORGE WILLIAM YOUNG.